US008886762B2

(12) United States Patent
Outlaw

(10) Patent No.: US 8,886,762 B2
(45) Date of Patent: Nov. 11, 2014

(54) STREAM DURATION MANAGEMENT

(75) Inventor: Bradley Outlaw, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 1177 days.

(21) Appl. No.: 12/562,002

(22) Filed: Sep. 17, 2009

(65) Prior Publication Data

US 2013/0212222 A1 Aug. 15, 2013

(51) Int. Cl.
G06F 15/16 (2006.01)
H04L 29/06 (2006.01)
H04N 21/43 (2011.01)
G06F 3/0485 (2013.01)

(52) U.S. Cl.
CPC ........ *H04L 65/4084* (2013.01); *H04N 21/4305* (2013.01); *H04L 65/4092* (2013.01); *G06F 3/04855* (2013.01)
USPC .......................................... 709/219; 709/231

(58) Field of Classification Search
CPC ........... H04L 65/4084; H04L 65/4092; H04N 21/4305; G06F 3/04855
USPC ....................................................... 709/219
See application file for complete search history.

(56) References Cited

U.S. PATENT DOCUMENTS

| 6,938,047 | B2 | 8/2005 | Kryeziu | |
|---|---|---|---|---|
| 7,400,764 | B2 | 7/2008 | Kryeziu | |
| 7,496,676 | B2 | 2/2009 | Kryeziu | |
| 2010/0303440 | A1* | 12/2010 | Lin et al. | 386/241 |
| 2011/0022471 | A1* | 1/2011 | Brueck et al. | 705/14.61 |

OTHER PUBLICATIONS

SWF File Format Specification, Version 10, Adobe Systems Incorporated, Nov. 2008 (http://www.adobe.com/devnet/swf/pdf/swf_file_format_spec_v10.pdf).

* cited by examiner

*Primary Examiner* — Emmanuel L Moise
*Assistant Examiner* — Xiang Yu
(74) *Attorney, Agent, or Firm* — Finch & Maloney PLLC

(57) ABSTRACT

In general, in one aspect, streaming content is received from a server, the streaming content being stored and queued for client-side playback from the server. Information about the streaming content is received. A virtual current duration of the streaming content is determined at a client-side application based on the information about the streaming content. A timeline control is generated based on the determined virtual duration, the timeline control presenting a representation of the virtual duration and allowing navigation forward and backward in the streaming content. The timeline control is displayed at the client-side display device.

12 Claims, 8 Drawing Sheets

STREAM DURATION MANAGEMENT

BACKGROUND

The present disclosure relates generally to delivering and presenting multimedia content.

Streaming is a technique for delivering multimedia content to end-users. Streaming involves continuously displaying media content to a user while the content is being delivered to the user. Streaming can be used to deliver various types of digital media to end-users. Streaming media can include, for example, recorded (e.g., recorded video) and/or live media content (e.g., video from a user's webcam).

Publishers can create content for streaming by capturing and/or encoding content (e.g., audio and video). A streaming media server can then receive and transmit created streams over a network (e.g., the Internet) to a client device. The client device can include a client-side player that processes and displays streams to an end-user. Customized, client-side image viewers and video players can present streaming media to end-users. These customized applications can be used to facilitate web applications in providing interactive rich media content.

Streaming media environments can use virtual machines to present streaming content to end-users. A virtual machine is a self-contained operating environment that allows programs to be run within the virtual machine itself as though the virtual machine were a stand-alone computer. Virtual machines can be programs themselves, embedded within an operating system or other software application, or otherwise installed on a computer. One example of a virtual machine is the ADOBE® FLASH® Player runtime (available from Adobe Systems Incorporated of San Jose, Calif.), which can be used to run FLASH® files including ACTIONSCRIPT® and SWF files (e.g., files formatted according to the SWF File Format Specification (Version 10) as published by Adobe Systems Incorporated of San Jose, Calif. (http://www.adobe.com/devnet/swf/pdf/swf_file_format_spec_v10.pdf)).

A DVR (digital video recorder) cache can be used in streaming media environments. DVR streaming technology can involve recording or caching content (e.g., live video) at a server running a DVR application and then streaming the content to a client for viewing by a user. The content can be published to the server and cached at the server, and the content can then be displayed to the user while the content is being streamed from the server to the client. The user can navigate the stream using a user interface element, such as a scrub bar.

SUMMARY

This specification describes technologies relating to determining and managing the duration of streaming content. Implementations consistent with this disclosure can provide client-side logic that grows a virtual current duration of content (e.g., live video) as it is streamed to the client from a server.

In general, in one aspect, a computer-implemented method is provided. The method includes: receiving streaming content from a server, the streaming content being stored and queued for client-side playback from the server; receiving information about the streaming content; determining, at a client-side application, a virtual current duration of the streaming content based on the information about the streaming content; generating a timeline control based on the determined virtual duration, the timeline control presenting a representation of the virtual duration and allowing navigation forward and backward in the streaming content; and displaying the timeline control at the client-side display device. Other embodiments can include corresponding systems, apparatus and computer program products.

Implementations can include one or more of the following features. For example, in some implementations, receiving information about the streaming content can involve receiving, from the server and in response to a request, the information about the streaming content in a metadata communication that is separate from the streaming content. In some implementations, receiving information about the streaming content can involve extracting information about the streaming content from metadata embedded with the streaming content.

In some implementations, the method further includes: determining whether the virtual current duration exceeds a threshold duration; sending to the server a subsequent request for information about the streaming content, when the virtual current duration exceeds the threshold value; and receiving, from the server, information about the streaming content in response to the subsequent request. The method can further include extending a total duration of the streaming content by an increment of time, when the virtual current duration exceeds the threshold value.

The information about the streaming content can include at least a current duration of the streaming content. Determining a virtual current duration at a client-side application can involve: (a) setting a timestamp associated with the streaming content, the timestamp representing a time that the information about the streaming content is received from the server; (b) identifying a current client-side system time associated with a system timer; (c) determining a difference between the current system time and the time represented by the timestamp; (d) adding to the determined difference the current duration received from the server in the information about the streaming content; and (e) storing the result of performing (a), (b), (c) and (d) as the virtual current duration.

In some implementations, the method further includes receiving a command that manipulates the timeline control, navigating in the streaming content based on the command, and displaying the streaming content based on the navigating. In some implementations, the method further includes: receiving a command to seek to a live time in the streaming content corresponding to a currently-streaming portion of the streaming content; determining, in response to the received command, a difference between the virtual current duration and a playback buffer capacity; determining a particular time in the streaming content based on the determined difference; and displaying the streaming content at the determined time.

In general, in another aspect, a machine-readable storage device storing a computer program product is provided. The computer program product has instructions operable to cause one or more data processing apparatus to perform operations comprising: receiving streaming content from a server, the streaming content being stored and queued for client-side playback from the server; receiving, from the server and in response to a request, information about the streaming content separate from the streaming content; determining, at a client-side application, a virtual current duration of the streaming content based on the information about the streaming content; generating a timeline control based on the determined virtual duration, the timeline control presenting a representation of the virtual duration and allowing navigation forward and backward in the streaming content; and displaying the timeline control at the client-side display device.

Implementations can include one or more of the following features. For example, in some implementations, the operations further comprise: determining whether the virtual current duration exceeds a threshold duration; sending to the server a subsequent request for information about the streaming content, when the virtual current duration exceeds the threshold value; and receiving, from the server, information about the streaming content in response to the subsequent request. The operations can further comprise extending a total duration of the streaming content by an increment of time, when the virtual current duration exceeds the threshold value.

The information about the streaming content can include at least a current duration of the streaming content. Determining a virtual current duration at a client-side application can comprise: (a) setting a timestamp associated with the streaming content, the timestamp representing a time that the information about the streaming content is received from the server; (b) identifying a current client-side system time associated with a system timer; (c) determining a difference between the current system time and the time represented by the timestamp; (d) adding to the determined difference the current duration received from the server in the information about the streaming content; and (e) storing the result of performing (a), (b), (c) and (d) as the virtual current duration.

In some implementations, the operations further comprise: receiving a command that manipulates the timeline control; navigating in the streaming content based on the command; and displaying the streaming content based on the navigating. In some implementations, the operations further comprise: receiving a command to seek to a live time in the streaming content corresponding to a currently-streaming portion of the streaming content; determining, in response to the received command, a difference between the virtual current duration and a playback buffer capacity; determining a particular time in the streaming content based on the determined difference; and displaying the streaming content at the determined time.

In general, in another aspect, a system is provided. The system comprises at least one processing device and a storage device storing instructions operable to cause the at least one processor to perform operations. The operations comprise: receiving streaming content from a server, the streaming content being stored and queued for client-side playback from the server; receiving, from the server and in response to a request, information about the streaming content separate from the streaming content; determining, at a client-side application, a virtual current duration of the streaming content based on the information about the streaming content; generating a timeline control based on the determined virtual duration, the timeline control presenting a representation of the virtual duration and allowing navigation forward and backward in the streaming content; and displaying the timeline control at the client-side display device.

Implementations can include one or more of the following features. For example, in some implementations, the operations further comprise: determining whether the virtual current duration exceeds a threshold duration; sending to the server a subsequent request for information about the streaming content, when the virtual current duration exceeds the threshold value; and receiving, from the server, information about the streaming content in response to the subsequent request. The operations can further comprise extending a total duration of the streaming content by an increment of time, when the virtual current duration exceeds the threshold value.

The information about the streaming content can include at least a current duration of the streaming content, and determining a virtual current duration at a client-side application can comprise: (a) setting a timestamp associated with the streaming content, the timestamp representing a time that the information about the streaming content is received from the server; (b) identifying a current client-side system time associated with a system timer; (c) determining a difference between the current system time and the time represented by the timestamp; (d) adding to the determined difference the current duration received from the server in the information about the streaming content; and (e) storing the result of performing (a), (b), (c) and (d) as the virtual current duration.

In some implementations, the operations further comprise: receiving a command that manipulates the timeline control; navigating in the streaming content based on the command; and displaying the streaming content based on the navigating. In some implementations, the operations further comprise: receiving a command to seek to a live time in the streaming content corresponding to a currently-streaming portion of the streaming content; determining, in response to the received command, a difference between the virtual current duration and a playback buffer capacity; determining a particular time in the streaming content based on the determined difference; and displaying the streaming content at the determined time.

Aspects of the subject matter described in this specification can be implemented to realize one or more of the following and/or other advantages. Implementations consistent with this disclosure can be used to grow, using client-side logic, the client-side representation of the duration of streaming content stored at a server side. This allows a virtual current duration of the streaming content (which can represent a portion of the stream that has been recorded to a server) to be determined and managed on the client side without the need to continually ping the server for duration updates. Because duration is managed locally at the client side, undesirable channel traffic to the server and demand on server processing resources can be reduced or avoided. Overall system efficiency can therefore be improved.

In addition, managing stream duration on the client side can allow for various features, such as offset support, quality of service, instantaneous startup, seeking and the like, when streaming content without a fixed duration. For example, a stream can include content associated with a live event (e.g., a football game) and may not have a known fixed duration. Continually growing the stream duration at the client-side can allow an end-user to navigate and control the stream (e.g., seek, pause, rewind, etc.). As another example, continually growing the stream at the client-side can support offsets, which can be used to control stream playback (e.g., start 5 seconds from beginning, discard everything except the last 5 minutes, etc.)

Details of one or more implementations are set forth in the accompanying drawings and the description below. Other aspects can be implemented in systems and computer program products, encoded on a computer-readable medium, operable to cause data processing apparatus to perform such operations. Other features, aspects and advantages will become apparent from the description, the drawings and the claims.

BRIEF DESCRIPTION OF THE DRAWINGS

Like reference numbers and designations in the various drawings indicate like elements.

DETAILED DESCRIPTION

Figure 1:
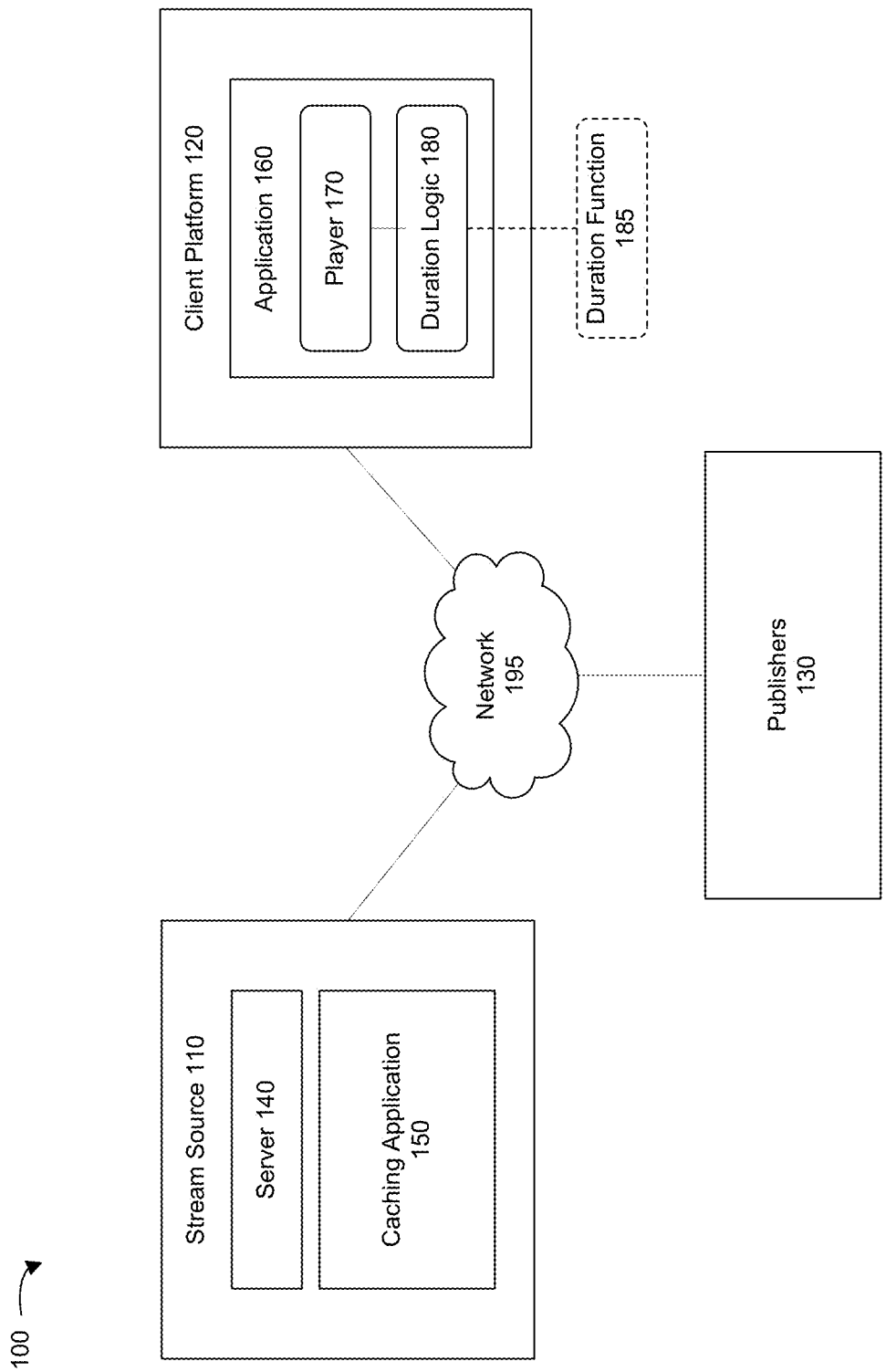
FIG. 1 is a diagram showing an example of a streaming environment consistent with this disclosure.

FIG. 1 shows an example environment 100 in which the duration of streaming content can be managed in a DVR streaming environment. The environment 100 is an example and not intended to be restrictive. Various modifications to the environment 100 are therefore possible without departing from the scope of this disclosure.

The environment 100 can include one or more stream sources 110, one or more client platforms 120 and one or more publishers 130, which can be coupled to a network 195. The elements 110, 120 and 130 can be implemented using software, hardware or firmware, or a combination thereof.

The stream source 110 can include any suitable element configured for storing and streaming a DVR stream over the network 195. The stream source 110 can include, for example, a media server or hub configured for streaming content over a network. As used herein, the terms "streaming content," "content stream" and "stream" and "DVR stream" can be interchangeable and refer to any media or other data item that is cached at the server side and streamed over a network for presentation to a user while the content is being streamed from the server side. A DVR stream can include, for example, video content, audio content and/or a combination of audio and video content. In some implementations, DVR streams can include various other data as well, such as text-based data, still image data and/or user-defined data.

As used herein, the term "streaming" (or any other form of the term "stream" when used as a verb) refers to delivering bits of a DVR stream such that the stream is continuously displayed to a user while the stream is being delivered to the user. When content is streamed to a destination, the content is displayed at the destination as the bits are delivered and then discarded without being permanently stored locally at the destination.

A DVR stream can be created and stored in various formats, which can employ various compression schemes (e.g., lossy and/or lossless compression) and various data structures (e.g., raster graphics and/or vector graphics). Streams can be created and stored in formats that allow for synchronized audio and video. In some examples, a stream can include content encoded with one or more codecs (e.g., the H.264, On2 VP6, and/or Sorenson Spark video codecs). In some examples, the streams can be represented in the MPEG-4 (Moving Picture Experts Group) format, the SWF format, the FLV (Flash Video File) format and/or the F4V format. Various other formats are also possible, including Waveform Audio (WAV), Audio Interchange File Format (AIFF); Free Lossless Audio Codec (FLAC), Apple Lossless, Windows Media Audio (WMA), MP3, Advanced Audio Coding (AAC), GIF (Graphic Interchange Format), PNG (Portable Network Graphics), and HTTP (Hypertext Transfer Protocol). Other formats are also possible.

The stream source 110 can include a server 140 and a caching application 150. The server 140 can be configured for recording streaming content received from the publishers 130 and streaming the content over the network 195 to the client platform 120 for display to an end-user. In some examples, the server 140 can include the ADOBE® FLASH® Media Server (FMS) system, available from Adobe Systems Incorporated of San Jose, Calif.

The server 140 can use the caching application 150 to locally store at the server 140 streaming content received from the publishers 130. The caching application 150 can include a server-side application that runs in conjunction with the server 140 to provide various functionality for storing and controlling DVR streams. In some examples, to effect such functionality, the caching application 150 can provide one or more Application Program Interfaces (APIs). The caching application 150 can be configured to store streaming content in one or more storage or memory elements (e.g., a disk) included in the stream source 110. Examples of suitable storage and memory elements are discussed below. In some examples, DVR streaming content can be associated with a corresponding file stored in or accessible to the stream source 110.

The caching application 150 can provide functionality for receiving, storing, generating, modifying and managing stream metadata associated with DVR streams. Stream metadata can include various information that describes a stream including, for example, stream name, stream author, stream current duration, total stream duration, copyright information, various offsets (e.g., ignore a certain portion of a stream), and various flags (e.g., true/false flags indicating whether or not a stream is recording). In some examples, stream metadata can include DVR metadata, which can refer to data created by the publisher 130 and augmented by the caching application 150. For example, the publishers 130 can specify the name and author of a stream, and the caching application 150 can add duration information and/or various flags to the metadata.

The DVR metadata can be separate from the stream and communicated in a metadata channel (e.g., a metadata communication) that is separate from the stream (as opposed to being interlaced into it). The separate metadata can be communicated over the same persistent connection as the stream or over a different connection. For example, the separate metadata can be communicated over the same TCP (Transmission Control Protocol) or UDP (User Datagram Protocol) connection as the stream but using a separate remote procedure call that does not travel over the stream pipeline. In some implementations, the separate channel established for DVR metadata can be unique to each client. The stream channel or pipeline can also be unique to each client (e.g., in unicast scenarios), though the content can be shared.

In alternative implementations, stream metadata can include true metadata embedded or interlaced into a stream. The embedded metadata can be communicated with the stream. For example, embedded metadata can be communicated (e.g., in data messages) over a stream pipeline with video content and/or audio content. The embedded metadata can be created and/or modified by various sources, including the publisher 130 and/or the server 140. In some examples, a publisher can embed metadata into a stream (e.g., duration information), and the server 140 can continually update the information.

In some cases, metadata interlaced into the stream itself can be recorded into the buffered stream data. When a user seeks around in the stream data, a previous (non-current) metadata event could fire. The separate metadata channel for DVR metadata can provide real time communication that is not bound to events that may have been previously executed and interleaved into the stream metadata.

The client platform 120 can include any suitable component for receiving and accommodating playback of streaming content. The client platform 120 can include, for example, a personal computer or workstation, a laptop, a mobile phone, a set-top box, a handheld device, or any other user access device. The stream source 110 and the client platform 120 can be geographically dispersed and operatively coupled via the network 195. The network 195 can include one or more communications networks, such as computer networks, telephone or other telecommunications networks, the Internet, etc. The network 195 can include one or more shared, public, or private data networks encompassing a wide area (e.g., a WAN) or local area (e.g., a LAN).

The client platform 120 can include a player 170 for facilitating playback of streams. The player 170 can include any mechanism that processes and displays streams for an end-user. The player 170 can include client-based software that runs FLASH® and/or other applications and supports vector and raster graphics, bidirectional streaming of audio and video and one or more scripting or other languages (e.g., JAVASCRIPT®, ACTIONSCRIPT®, and the like). Further, the player 170 can integrate FLASH® and other applications with an operating system to provide various functionality and features to the user access device 120. In some examples, the player 170 can include a client-side virtual machine configured as a standalone player or as a plugin for browsers (such as MOZILLA® FIREFOX®, OPERA™, SAFARI® and INTERNET EXPLORER®). In some examples, the player 170 can include the ADOBE® FLASH® Player runtime (available from Adobe Systems Incorporated of San Jose, Calif.), which can run for example SWF files, FLV files and/or F4V files.

In some examples, the player 170 can include and/or access one or more playback buffers to facilitate playback of streams. The playback buffers can be configured to store content that is streamed to the client platform 120 for playback as it is being processed for playback. In some examples, the playback buffer can be configured to store a certain amount (e.g., 10 seconds) of streaming content. The player 170 can use the buffers to locally store a portion of an incoming stream before beginning playback of the stream. The buffers can be implemented using software, hardware or firmware, or a combination thereof.

The player 170 can be implemented as an independent component that runs on the client platform 120 and/or as an embedded component. In some implementations, the player 170 can be configured to run in conjunction with a Web application. In some examples, the player 170 can be implemented as a "plug-in" type component that provides various functionality to, and extends the feature set of, one or more host applications. Such host applications can provide services to the plug-in to allow the plug-in to interact with the host application. The host applications and/or the OS can include APIs that allow plug-ins to be added and interact with the host applications.

The player 170 can be embedded in an application 160 (e.g., a FLASH®-based application), and the application 160 can use or rely on the player 170 during operation. As used herein, the term "application" refers to any computer program having some defined purpose appreciable by a user. An application can include various computer programs (also referred to as programs, software, software applications, software modules, or code), which contain instructions executable and/or interpretable by a processor. An application can include one or more files containing various information, such as source code, machine code, libraries, data, documentation, configuration information, icons, or any other resources that can be used by an application and the installation procedure for that application. An application (or portion thereof) can be platform dependent or independent. The application 160 can, in some implementations, represent an application created using various application development frameworks and/or web development tools, such as ADOBE® FLEX® BUILDER™ software, ADOBE® FLASH® software and ADOBE® DREAMWEAVER® software, available from Adobe Systems Incorporated of San Jose, Calif.

The player 170 and the application 160 are not limited to the FLASH® platform or FLASH®-based applications. The player 170 can be implemented and run in, and/or configured to run and/or support applications created with, various other platforms and environments without departing from the scope of this disclosure.

The client platform 120 can include duration logic 180 configured to manage the duration of streams as they are received from the stream source. The duration logic 180 can be configured to continually determine a virtual current duration of a stream received from the server 140. The virtual current duration of a stream can include an estimation or representation of a portion of the stream (e.g., the stream 205 in FIG. 2) that has been recorded (e.g., written to memory at the stream source 110). The duration logic 180 can determine and manage the stream duration using a duration function 185, the details of which are discussed below in connection with FIG. 2.

The duration logic 180 can be implemented using software, hardware or firmware, or a combination thereof. In some examples, the duration logic 180 can be implemented using a class file that is imported into the application 160 or the player 170. The duration logic 180 can communicate with the stream source 110 and use information received from the stream source 110 (e.g., stream metadata) to estimate the current duration of a particular stream (using the duration function 185). The duration logic 180 can grow the duration of the stream locally without the need to continually ping the stream source 110 for duration updates. In some implementations, the client platform 120 can use the duration logic 180 to allow a user or application to control playback of a stream. For example, the client platform 120 can use the determined virtual current duration to generate one or more control elements (e.g., a seek bar or scrub bar) that represents the virtual current duration and that allows an end-user to manipulate playback of a stream. Additional details of such an interface element are discussed below in connection with FIG. 3.

In some examples, one or more publishers 130 (which can be geographically dispersed) can provide content streams to the stream source 110. A publisher can include any entity that creates, captures, updates, distributes, owns or otherwise controls or manages multimedia content. The publishers 130 can include, for example, software developers. The publishers 130 can also include, for example, end-users. The publishers 130 can provide recorded or live content (e.g., from a webcam) to the stream source 110 for streaming to other users.

In some implementations, the publishers 130 can be associated with the application 160 or another application. In some examples, the publishers 130 can include or be associated with one or more encoders and/or other capture components for capturing live audio and video. The capture components can support, for example, one or more codecs (e.g., the H.264, On2 VP6, Sorenson Spark and/or Advanced Audio Coding (AAC) codecs) for encoding content. The capture components can be configured to stream captured content in real time to the streaming source 110, which in turn can stream the content to the client platform 120 for end-user viewing.

Figure 2:
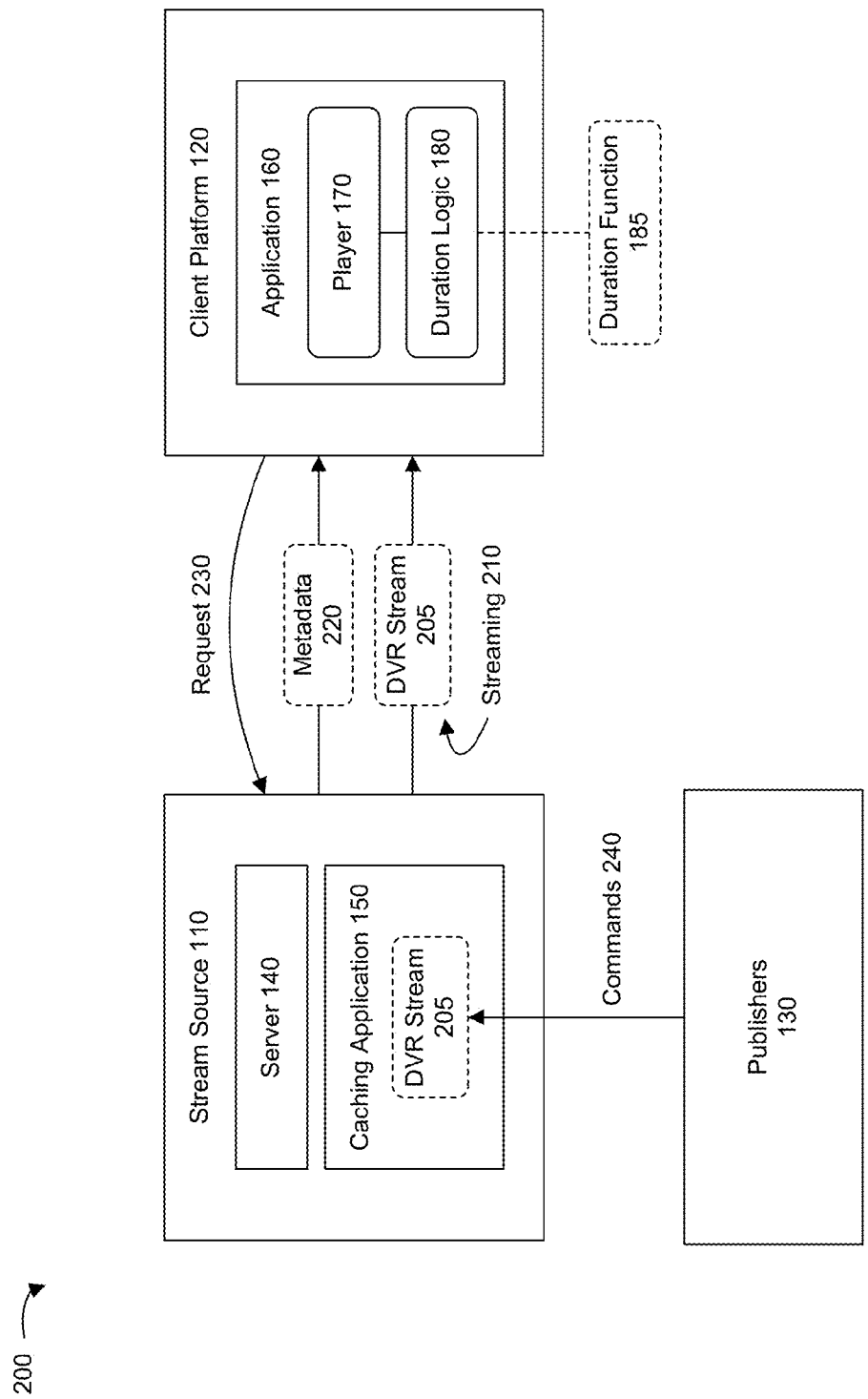
FIG. 2 is a diagram showing an example of a stream duration management dataflow.

FIG. 2 shows an example dataflow 200 consistent with some implementations. The dataflow 200 is an example only, and various modifications to the dataflow 200 are therefore possible without departing from the scope of this disclosure.

The dataflow 200 can involve streaming 210 a DVR stream 205 from the stream source 110 to the player 170 at the client platform 120. The DVR stream 205 can be sent to the stream source 110 by the publisher 130 and locally cached at the stream source 110 by the caching application 150. For example, the publisher 130 can capture live video (e.g., a video of a football game) using a video capture device and send the live video to the stream source 110 for streaming to the user access device 120. To effect recording of content, the publishers 130 can send one or more commands 240 to the stream source 120 that request that content be stored (e.g., written to disk) at the stream source 110. The caching application 150 can locally cache the live video at the streaming source 110, and the streaming source 110 can then deliver the content to the user access device 120.

During the streaming 210, a persistent connection can be established between the stream source 110 and the player 170, which can facilitate the streaming 210 from the source 110 to the player 170. In some implementations, the connection may be established using TCP (Transmission Control Protocol), UDP (User Datagram Protocol) and/or other protocols. For example, the player 160 may connect to the stream source 110 using RTMP (Real Time Messaging Protocol) and/or RTMFP (Real Time Media Flow Protocol). The stream source 110 can maintain the stream 205 using the caching application 150 and deliver the bits of the stream to the player 170 during the streaming 210 phase.

In the dataflow 200, the player 170 (or the application 160) can receive metadata 220 about the stream 205 from the stream source 110. The stream metadata 220 can represent DVR metadata, which can be generated by the publishers 130, augmented by the stream source 110 and received at the client platform 120 in a metadata communication that is separate from the stream 205. The DVR metadata can be communicated over the same persistent connection between the stream source 110 and the player 170 as the stream or over a different connection. In this fashion, the stream metadata 220 can represent tangential descriptive data related to the stream 205 that is separate from the stream 205 (e.g., not embedded in the stream).

Additionally or alternatively, stream metadata can include all or portions of true, embedded metadata that is embedded or interlaced into the stream 205. In such implementations, the streaming source 110 can be configured to provide embedded stream metadata (as opposed to DVR metadata) to the client platform 120. Whether generated separate from the stream or embedded in the stream, the metadata 220 can include various information that describes the stream 205 including, for example, one or more of a current duration of the stream, a total stream duration, a stream name, a stream author, copyright information, various offsets (e.g., ignore a certain portion of a stream), and various flags (e.g., true/false flags indicating whether or not a stream is recording at the stream source 110).

The player 170 or the application 160 can receive the metadata 220 in response to a request 230. The request 230 can include, for example, a communication sent from the client platform 110 to the stream source 110 (e.g., a remote procedure call to the caching application 150 or a native method call to the server 140) for DVR metadata, true embedded metadata and/or stream duration information. In some examples, the player 170 or the application 160 can request 230 from the stream source 110 DVR metadata that is separate from the stream and generated (or augmented) by the stream source 110. Additionally or alternatively, the player 170 or the application 160 can request 230 from the stream source 110 true metadata embedded in the stream. In this case, the player 170 or the application 160 can receive the embedded metadata and extract certain information (e.g., duration information) from the metadata.

In some implementations, metadata embedded in a stream (e.g., a live recorded stream) can be continually updated (e.g., by the server 140) with the duration of the stream length. The updated metadata information can be provided in response to a request. Additionally or alternatively, certain events (e.g., occurring at the client platform 120) related to a stream can be configured to automatically trigger embedded metadata to be sent back to the client platform 120. Such events can include, for example, the beginning of playback, pauses and/or seeks related to a stream.

The player 170 can make an initial request 230 or metadata extraction prior to playing back the stream 205. The duration logic 180 can use information included in the stream metadata 220 (e.g., the current duration) to determine and manage a virtual current duration of the stream 205. The virtual current duration can be an estimation of the current duration of the stream, which can represent a portion of the stream that has been recorded at the stream source 110.

In particular, at or near the time of the initial request 230, the duration logic 180 can register the value of the current duration received in the metadata 220 at that time. Additionally, the duration logic 180 can earmark a timestamp, which can represent the time that the request 230 (or metadata extraction) occurred. The duration logic 180 can then continually poll (e.g., every ¼ second, every second, etc.) a local client-side duration function 185, which can be represented by the following equation:

Virtual current Duration=(Current System Time−Timestamp)+Current Duration From Server At Last Query(Or From Last Extraction From Metadata)

Each time the duration function 185 is polled, the duration logic 180 can update the current system time by accessing, for example, a current value of a local client-side system timer or clock. The duration logic 180 can continually update or grow the virtual current duration using the duration function 185 without continually pinging the stream source 110 for duration updates. In this fashion, the duration logic 180 facilitates client-side management of stream duration.

During the dataflow 200, two scenarios can occur during playback of the stream 205. The first scenario is a fixed duration scenario, which can occur when a fixed total duration of the stream 205 is known (e.g., set in the metadata 220 by the publisher 130 or the stream source 110). The second scenario is a perpetual growth scenario, which can occur when the stream 205 does not have a total duration defined in the metadata 220.

With a fixed duration stream, at or near the time of the initial request 230, the duration logic 180 can register the value of the current duration (received in the metadata 220) at that time and earmark a timestamp, as discussed above. The duration logic 180 can then continually poll the local client-side duration function 185. The application 160 or the player 170 can then make subsequent requests 230 for stream metadata 220 at various times during playback of the stream 205. These subsequent requests (or re-queries) can be used to obtain updates about the duration of the stream 205. When a metadata re-query occurs, the duration logic 180 can re-sync and recalculate the virtual current duration based on the new metadata 220 values, reset timestamps, etc.

During playback of a fixed duration stream, the application 160 or the player 170 can re-query the metadata 220 in response to the virtual current duration of the stream 205 reaching a threshold value. This threshold duration can represent an amount of time relative to the total duration of the stream 205, which can be defined in the stream metadata. That is, the threshold duration (the time when a re-query is triggered) can be equal to the difference between the total duration (defined in the metadata) and a threshold variance value (e.g., 5 minutes). For example, if the total duration of the stream 205 is 2 hours, a variance of 5 minutes can be used to trigger a metadata re-query when the virtual current duration of the stream 205 reaches a threshold duration of 1 hour and 55 minutes (i.e., 5 minutes of the total 2-hour duration). The client platform 120 can re-query the metadata 205 to obtain updates about the current stream duration, which can be used to manage duration at the client side. In some examples, the variance value can be set by the publishers 130.

In the perpetual growth scenario, the duration logic 180 can grow or extend a total duration of the stream 205 perpetually. In this scenario, the duration logic 180 can continually append a block of time to the end of the virtual current duration after each metadata query, which can occur according to (1) the variance variable discussed above and (2) an increment value that specifies the amount of time to append to the duration. As an example, the increment value can be 30 minutes and the variance value can be 5 minutes. After the initial metadata query, the metadata 205 can indicate that 10 minutes of the stream 205 has been recorded at the stream source 110. The duration logic 180 can append a block of time to the current duration, which grows the total stream duration to 40 minutes (representing the 10 minute current duration+ the 30 minute increment value). Once the virtual current duration ((Current System Time−Timestamp)+Current Duration From Server At Last Query) of the stream 205 reaches 35 minutes, the variance value (e.g., 5 minutes) can trigger a metadata re-query. If the stream source 110 indicates in the metadata that the stream 205 is still recording, then the duration logic 180 can append 30 minutes to the virtual current duration, which grows the stream duration to 65 minutes. Once the virtual current duration of the stream 205 reaches 60 minutes, then the 5 minute variance value can trigger another metadata re-query. This process can continue until the metadata indicates that the stream source 110 is no longer recording the stream 205, in which case the stream 205 can be treated as a Video-On-Demand file and the duration received from the stream source 110 can become the total fixed duration.

In alternative implementations, to grow the total stream duration, the duration logic 180 can continually append a block of time to the end of a virtual or estimated total duration (as opposed to the current duration) after each metadata query, which can occur according to a variance variable (e.g., 5 minutes) and an increment value (e.g., 30 minutes). For example, after the initial metadata query, the duration logic 180 can determine an estimated total duration of the stream to be 40 minutes (e.g., in the manner discussed above). Once the virtual current duration reaches 35 minutes, the variance value (e.g., 5 minutes) can trigger a metadata re-query. If the stream source 110 indicates in the metadata that the stream 205 is still recording, then the duration logic 180 can append a block of time (e.g., 30 minutes) to the total duration, resulting in a total duration of 70 minutes. Once the virtual current duration of the stream 205 reaches 65 minutes, then the 5 minute variance value can trigger another metadata re-query. This process can continue until the metadata indicates that the stream source 110 is no longer recording the stream.

In some examples, if the total duration is fixed, then a single re-query can be performed at the threshold duration (determined by the variance value). If the total duration in the metadata 220 has not changed since the last query, then the progress does not exceed this total duration value. If the stream playback encounters a stop, the duration logic 180 can re-query for current metadata and adjust the duration accordingly. If an end-user pauses the video, the timers and calculations can persist and continue to grow the virtual current duration.

In some implementations, if embedded metadata (as opposed to DVR metadata) is used in the fixed duration scenario, the publisher of a stream can include a variable in the embedded metadata denoting the total duration of the stream (e.g., the total intended duration of a live event being recorded). In some implementations, the total duration can be known or obtained from a third party (e.g., any entity, such as the publisher 130, configured to communicate with the stream source 110 to manipulate stream metadata), and the duration value in the embedded metadata can be used to track the progress. In the perpetual duration scenario, use of embedded metadata can involve perpetually growing the stream on the client in order to estimate what has parity on the server.

Whether in the fixed duration scenario or the perpetual duration scenario, a snap-to-live event can occur in the dataflow 200. This refers to a situation in which an end user wishes to snap or seek to a live time associated with streaming content as it is streaming (as opposed to playing the stream from its beginning). As used herein, the term "seek" can refer to or involve a request for data at a specific time in a stream. The live time can include a time corresponding to the most recent data associated with the actual live stream (e.g., the time corresponding to the most recent data recorded at a server).

Because the playback of a stream can involve a client-side playback buffer, the end user may need to wait until the buffer fills before the user can seek to the live time point in the streaming content. The application 160 (e.g., in conjunction with the player 170 and the duration logic 180) can include one or more rules used for providing snap-to-live functionality. These rules can determine the time in the stream that the end-user can snap or seek to based on the determined virtual duration and the playback buffer. For example, the rules can determine the snap-to time by determining the difference between the virtual current duration and the buffer (i.e., virtual duration−buffer). As an example, if the virtual current duration of the stream is 300 seconds and the playback buffer stores 10 seconds of content, then the time that the user can seek to is 290 seconds (300−10=290).

In some examples, the client platform 120 can use the duration logic 180 to generate one or more user interface elements (e.g., a seek bar or scrub bar) that allows an end-user to manipulate the stream 205. For example, based on the determined virtual current duration, the client platform 120 can build an interface element that allows an end-user to track the progress of the stream 205 and navigate forward and backward in time within the stream 205. The interface element can be displayed on one or more client-side display devices (e.g., a video display device and/or a non-video output device, such as an LED output device). In some implementations, the interface element can include or be associated with audible elements presented via one or more audio display devices.

Figure 3:
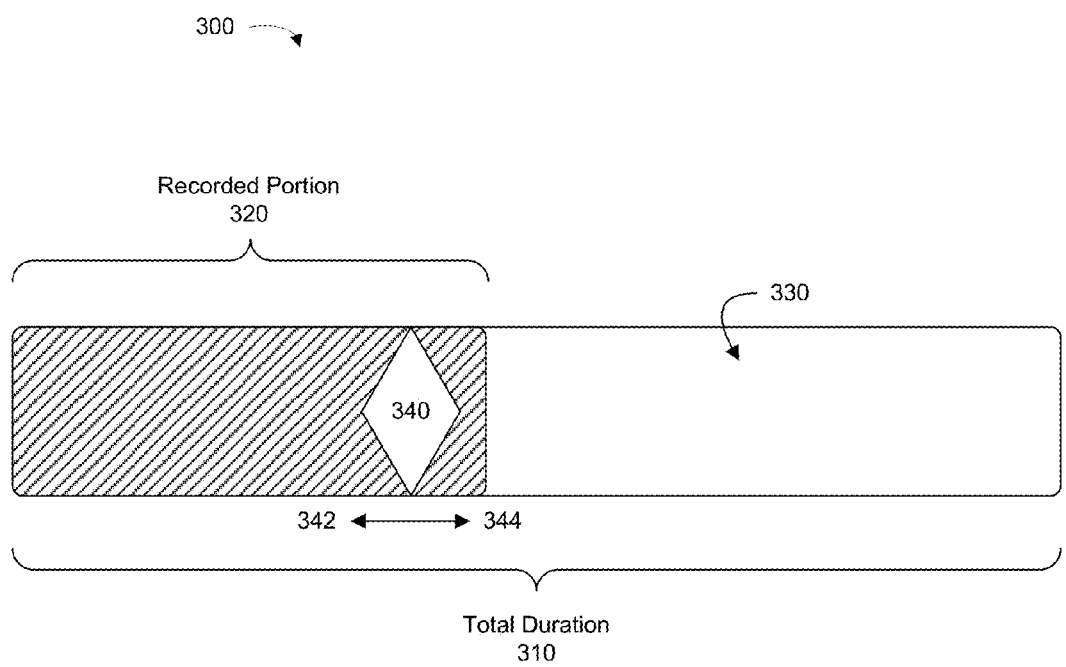
FIG. 3 is a block diagram showing a conceptual overview of a user interface element that can be generated using a virtual current duration.

FIG. 3 shows an example of an interface element 300 that can be generated using a determined virtual current duration of the stream 205. The interface element 300 can include a total duration region 310 that visually indicates the total duration of the stream 205. The interface element 300 can further include a recorded portion region 320 that visually indicates a portion of the stream 205 that has been recorded (e.g., written to memory at the server). In addition, the interface element 300 can include a region 330 that graphically represents the amount of the total duration not yet recorded (i.e., the difference between the total duration and the recorded portion). The regions 310, 320 and 330 can be visually differentiated from each other using various suitable techniques, such as shading, highlighting and the like. In some examples, the recorded portion 310 and the region 330 not yet recorded can be visually differentiated with different colors or different shading.

The interface element 300 can further include a playhead (or sprite) 340. The playhead 340 can include any visual indicator that tracks the currently-playing portion of the stream 205. The playhead 340 can represent the point in the stream currently being played independent of absolute time. The playhead 340 can be configured to move in response to user manipulation in order to effect navigation in the stream 205. For example, the playhead 340 can move laterally to navigate forwards (344) and backwards (342) in time within the recorded portion of the stream 205.

The interface element 300 is an example only, and various other graphical and non-graphical elements and configurations are within the scope of this disclosure. For example, various numeric representations of stream duration can be generated based on the determined virtual stream duration.

The discrete modules shown in FIGS. 1 and 2 are used herein for purposes of explanation only, and various other arrangements are within the scope of this disclosure. For example, the various functionality of the modules shown in the figures can be distributed or exist in more or less modules than what is shown in the figures. The particular configuration, arrangement and feature set of the individual modules will typically depend on the particular operating environment. In addition, various modifications to the dataflow 200 of FIG. 2 are possible, depending on the particular context and operating environment.

In some implementations, for example, an intermediate server can be disposed between the stream source 110 and the client platform 120. Or the stream source 110 can be configured as an intermediate server for another source of streaming content. The stream source 110 can locally cache DVR streams, and the intermediate server can communicate with the stream source 110 and the client platform 120. The intermediate server can include suitable linkage components (e.g., software) to communicate with and receive the DVR streams from the streaming source 110. The client platform 110 can communicate with the intermediate server to receive the streams and obtain metadata about the streams. In some examples, after sending to the intermediate server an initial request (e.g., the request 230) for metadata, the client platform 120 can wait a predetermined amount of time and then re-query the intermediate server. This re-querying can provide time for the intermediate server to retrieve the metadata from the stream source 110. In some examples, in response to the initial metadata query, the intermediate server can send the client platform 120 an event or instruction indicating that the client platform 110 should re-query after a certain amount of time (e.g., 5 seconds). In response to this event, the client platform 120 can set a timer and the send a subsequent metadata query.

In some implementations, the stream source 110 can be configured to provide a stream length value (as opposed to DVR metadata or embedded metadata) to the client platform 120 in response to a request (e.g., a native method call to the server 140). In such implementations, the duration logic 180 can be configured to use this stream length information to determine and manage a virtual current duration of the stream 205. The player 170 or the application 160 can request the stream length information from the server and then continually poll the local client-side duration function to continually update or grow the stream duration. The application 160 or the player 170 can then make subsequent requests for the stream length at various times during playback of the stream to obtain updates about the duration, in a manner consistent with what is described above in connection with re-querying metadata. Various other arrangements, data flows and modifications to what is shown in FIGS. 1 and 2 are also possible, depending on the particular context and operating environment.

Figure 4:
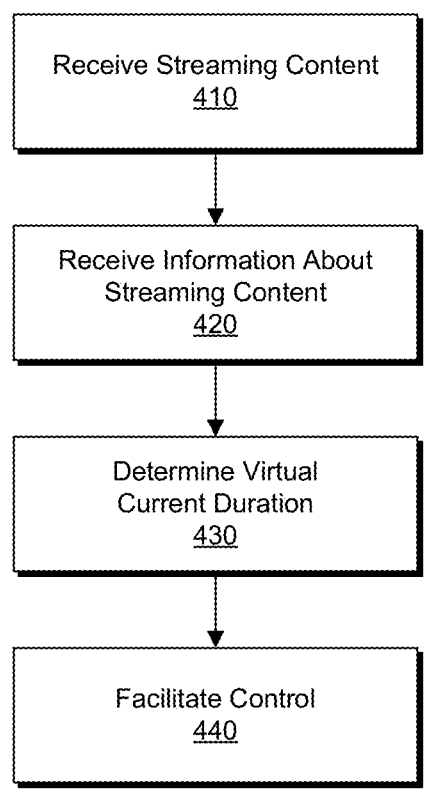
FIG. 4 is a flow diagram showing an example of a process for managing stream duration.

FIG. 4 is a flow diagram showing an example client-side process 400 for managing stream duration consistent with this disclosure. The process 400 can be performed by one or more elements in one or more data processing apparatus. The process 400 can be performed by one or more processors executing one or more instructions from storage or memory. The process 400 can involve receiving 410 streaming content; receiving 420 information about the streaming content; determining 430 a virtual current duration of the streaming content; and facilitating 440 control of the streaming content based on the virtual current duration.

The process 400 can receive 410 streaming content. This can involve a client (e.g., the client platform 120) receiving from a server (e.g., the server 140) one or more DVR streams (e.g., the stream 205) that are cached at the server. The received DVR streaming content can include, for example, an audio stream, a video stream, and/or a mixed stream having both audio and video. In some examples, the streaming content can include a live stream. For example, the streaming content can include a stream from an information capture device (e.g., a video camera) that is recording a live event (e.g., a football game or a concert). In some examples, the received stream can include various data content, such as text data, still image data and/or other user defined marshaled (e.g., serialized for transmission) data formats.

The process 400 can receive 420 information about the streaming content. This can involve sending a request to the server for data associated with the received stream and receiving the data from the server. The data can be created by a publisher of the stream and augmented by the server, and it can be sent in a channel separate from the stream. The received information about the stream can include information about the current duration of the stream, which can be set by the publisher of the stream and/or determined by the server. The received information can include various other information about the stream as well (e.g., name, author, etc.). In some implementations, the receiving 420 information about the stream can involve extracting certain information (e.g., duration information) from true metadata interlaced or embedded within the received stream, as opposed to requesting data from the server.

The process 400 can determine 430 a virtual current duration associated with the received stream. This can involve continually polling the client-side duration function 185 using the current system time (e.g., a current value of a local client-side system timer or clock) and duration information included in the received information about the stream (received at 420), to grow and manage the stream duration without continually pinging the server for additional information. Each time the duration function 185 is polled, the current system time at the time of polling the function can be used to grow the virtual current duration. In this fashion, the process 400 can grow and manage the duration of the stream without continually pinging the sever for duration updates. Additional details of determining 430 a virtual current duration are discussed below in connection with FIGS. 5 and 6.

The process 400 can facilitate 440 control of the received stream based on the determined virtual current duration. This can involve using the determined virtual current duration to allow an application or an end-user to manipulate or control playback of the received stream. For example, facilitating control can involve allowing a user or an application to navigate (e.g., seek) forwards and backwards in time within the playing stream or to snap or seek to a particular point in the stream.

In some examples, facilitating 440 control can involve generating and/or updating a timeline control (e.g., a scrub bar or other suitable user interface element) that allows navigation in the streaming content. The timeline control can be generated for display on a display device at the client platform 120. The timeline control can represent virtual duration having parity on the server. The timeline control can include at least a graphical representation of a total duration (e.g., which can be set in metadata or estimated) of the streaming content, a graphical representation of a portion of the total duration of the streaming content stored at the server (e.g., recorded to disk), and a playhead graphically representing a currently-playing portion of the streaming content. When manipulated, the playhead can effect navigation in the streaming content. The various portions of the timeline control can be updated or re-scaled whenever the total duration value changes (e.g., when a block of time is appended in the perpetual growth scenario). In some implementations, generating a timeline control can include generating and/or updating an interface element consistent with the interface element 300 shown in FIG. 3, which provides navigation control by way of the graphical playhead 340.

Figure 5:
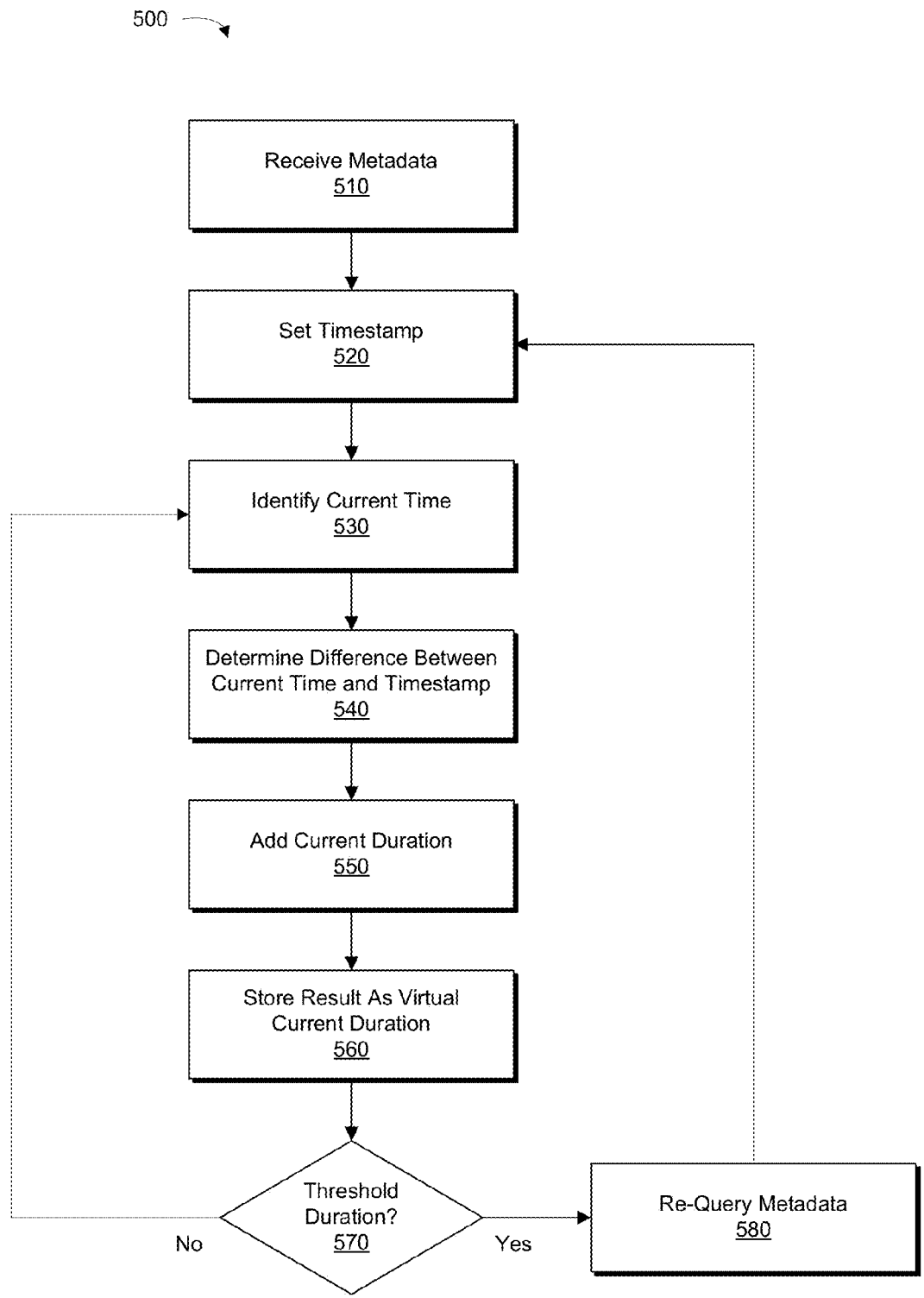
FIG. 5 is flow diagram showing an example of a process for managing the duration of a fixed duration stream.

FIG. 5 is a flow diagram showing an example process 500 for managing stream duration in a fixed duration scenario. The process 500 can be performed by one or more elements in one or more data processing apparatus. The process 500 can be performed by one or more processors executing one or more instructions from storage or memory.

The process 500 can involve receiving 510 metadata about a received DVR stream. This can involve requesting information (e.g., current duration information) about the received stream from a server and/or extracting the information from metadata embedded within the stream. The receiving 510 can include parsing the received information and checking for certain flags or conditions. For example, the metadata can include a flag that indicates whether or not a particular stream should be ignored. If this offline flag is set, then the process 500 can ignore the stream.

After receiving the metadata (and parsing it and checking for flags or conditions), the process 500 can set 520 a timestamp. The timestamp can represent the time of the metadata request, extraction or receipt. After setting the timestamp, the process 500 can identify 530 the current system time, for example, by accessing a client-side timer or system clock. The process 500 can then determine 540 the difference between the current system time and the timestamp. The process 500 can then add 550 the duration (e.g., 60 seconds) indicated in the received metadata to this difference (e.g., 1 second), and the process 500 can store 560 the result (e.g., 61 seconds) as the virtual current duration of the stream.

The process 500 can determine 570 whether the virtual current duration of the stream reaches or is within a threshold duration. This threshold duration can represent an amount of time relative to the total duration of the stream, which can be included in the stream metadata. That is, the threshold duration can be equal to the difference between the total duration (defined in the stream metadata) and a threshold variance value. For example, if the total duration of the stream is determined to be 60 minutes and the variance is set as 5 minutes, the threshold duration would be reached when the virtual current duration of the stream reaches 55 minutes.

If the process 500 determines that the virtual current duration is within the threshold duration, the process 500 can repeat the identifying 530, the determining 540, the adding 550 and the storing 560. Once the virtual current duration reaches the threshold duration, then the process 500 can re-query 580 the metadata to obtain (e.g., from the server) updated information about the stream, which can include an updated duration of the stream. The re-querying 580 can include sending another request to the server for metadata separate from the stream and/or performing another extraction of information from metadata embedded in the stream. The process 500 can then set 520 a timestamp, which can represent the time of the metadata request, extraction or receipt. The process 500 can use the updated information to re-factor the virtual duration.

Figure 6:
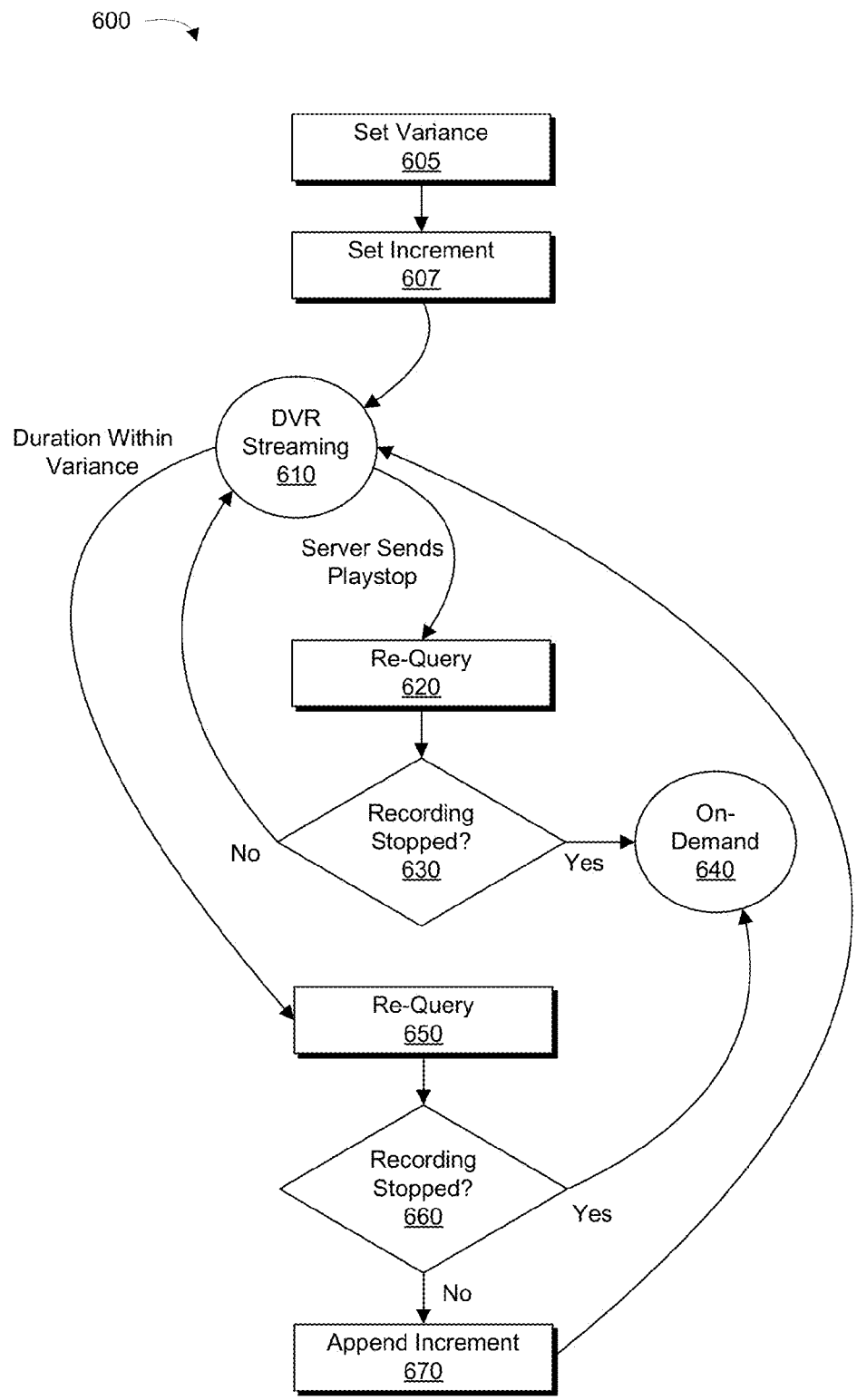
FIG. 6 is a combined state diagram and flow diagram showing an example of a process for managing the duration of a perpetual duration stream.

FIG. 6 is a combined state diagram and flow diagram showing an example process 600 for managing stream duration in a perpetual duration scenario. The process 600 can be performed by one or more elements in one or more data processing apparatus. The process 600 can be performed by one or more processors executing one or more instructions from storage or memory.

The process 600 can be used to continually append a block of time to the end of the virtual current duration of a perpetual duration stream after each metadata query (or extraction), which can occur according to a variance variable and an increment value that specifies the amount of time to append to the duration. The process 600 can set 605 a variance value, which an be used to trigger a metadata queries or extractions (e.g., to obtain updated information about a stream). The process 600 can set 607 an increment value used to specify the amount of time to append to the virtual current duration. As an example, the process 600 can set the increment value to 30 minutes. In this example, the process 600 would append 30 minutes to the virtual current duration after each metadata query or extraction.

After setting the variance and the increment values, the process 600 can enter a DVR streaming state 610. In this state, the process 600 can play back the stream for an end user. In addition, the process 600 can manage a virtual current duration of the stream and grow a total duration of the stream. This can involve, for example, receiving or retrieving information about the current duration of the stream included in stream metadata provided by a server and/or extracting information about the current duration from metadata embedded in the stream. The process 600 can determine the virtual current duration using this metadata information, for example, by continually polling a client-side duration function (e.g., the function 185) to grow the virtual current duration of the stream. The process 600 can append a block of time (e.g., the 30 minute increment value) to the current duration, which grows the total stream duration.

If the server sends a command or otherwise indicates that playback of the stream should be stopped, then the process 600 can re-query 620 stream metadata and determine 630 if the server is still recording the stream. If the server is not recording the stream, then the process 600 can enter an on-demand state 640. In the on-demand state, the process 600 can treat the stream as on-demand content (e.g., a video-on-demand file) and the duration received from the server can become the total fixed duration. If the server is recording the stream, the process 600 can remain in the DVR streaming state 610.

Once the virtual current duration reaches a threshold duration (determined by the variance value set at 605), the process 600 can re-query 650 the stream metadata, for example, to obtain updated information about the current duration of the stream. If the process 600 determines 660 that the server is still recording the stream, then the process 600 can append 670 the increment (e.g., 30 minutes) to the virtual current duration. If the process 600 determines that the server has stopped recording the stream, then the process 600 can enter into the on-demand state 640.

Figure 7:
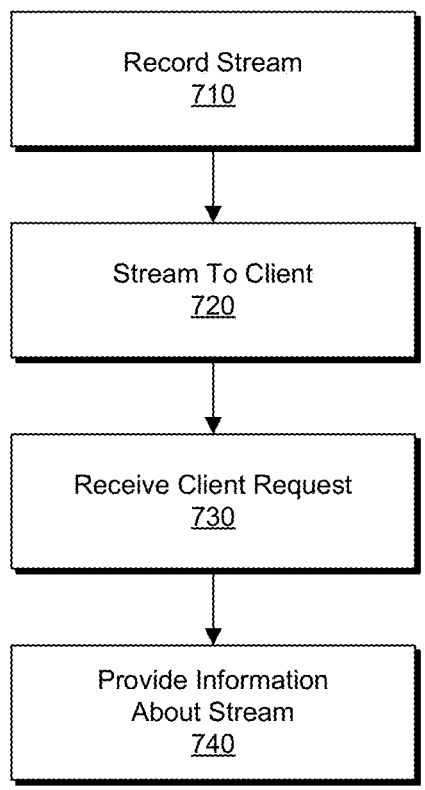
FIG. 7 is a flow diagram showing an example of a streaming process.

FIG. 7 is a flow diagram showing an example of a streaming process 700, which can represent aspects of server-side operations. The process 700 can be performed by one or more elements in one or more data processing apparatus. The process 700 can be performed by one or more processors executing one or more instructions from storage or memory. The process 700 can involve recording 710 a stream; streaming 720 the content to a client; receiving 730 a client request for information about the stream; and providing 740 information about the stream to the client.

The process 700 can involve recording 710 a stream. Recording a stream can include, for example, receiving commands from a publisher (e.g., a publisher 130) to record a media stream. Recording a stream can further include locally storing or caching the stream at the server side, for example, using the caching application 150.

The process 700 can stream 720 the media stream to a client over a network. This can involve a server (e.g., the server 140) streaming to a client (e.g., the client platform 120) one or more DVR streams (e.g., the stream 205) cached at the server. The DVR streaming content can include, for example, an audio stream, a video stream, and/or a mixed stream having both audio and video. The streaming content can include a live stream.

The process 700 can receive 730 a client request for information about the stream. This can involve the server (e.g., the server 140) receiving from the client (e.g., the client platform 120) a request for information about the media stream. The requested information can include stream metadata that is created by the stream publisher and augmented by the server. The metadata can include information about the current duration of the DVR stream.

The process 700 can provide 740 information about the stream to the client in response to the request. This can involve the server sending to the client the requested information in a metadata channel separate from the streaming media stream. The requested information can then be used to determine a virtual current duration of the media stream. The client can use the client-side duration function 185 to determine and grow the virtual current duration of the stream.

The sequences of events shown in FIGS. 4-7 are examples and not intended to be limiting. Other processes can therefore be used and, even with the processes 400, 500, 600 and 700 depicted in FIGS. 4-7, events can be re-ordered, added and/or removed as appropriate. Furthermore, the elements of the processes can overlap and/or can exist in fewer or more stages or operations than the number shown in the figures. In some examples, processes can be re-arranged and configured to accommodate and/or exploit multitasking and parallel processing techniques and/or other aspects of various system architectures.

Figure 8:
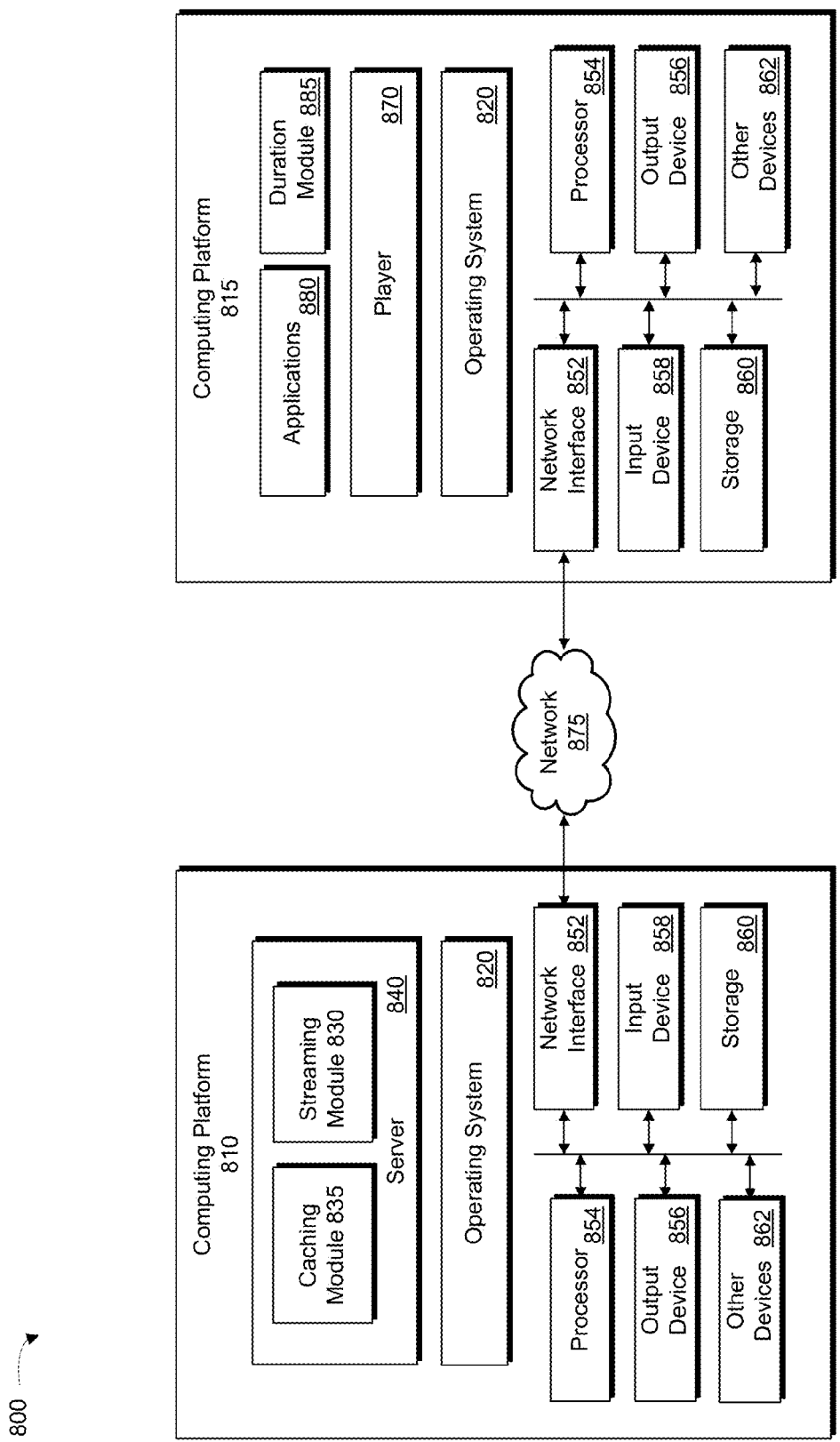
FIG. 8 is a block diagram showing an example of a data processing environment consistent with this disclosure.

FIG. 8 shows an example data processing environment 800 in which duration logic can be implemented to manage stream duration. Separate computing platforms 810 and 815 each include hardware and software. In some examples, the computing platform 810 can be configured as the streaming source 110 (e.g., a streaming media server), while the computing platform 815 can be configured as the client platform 120 (e.g., an end-user computer). The computer platforms 810 and 815 can be geographically dispersed and operatively coupled via a network 875, which can be similar to the network 195 discussed above in connection with FIG. 1.

The processes 400, 500, 600 and 700 can be performed by one or more elements in the data processing environment 800. For example, the processes 400, 500 and 600 can be client-side processes performed by one or more client-side processors (e.g., the processor 854 in the client computing platform 815) executing one or more instructions from storage or memory. The processes 700 can be a server-side process performed, for example, by one or more server-side processors (e.g., the processor 854 in the server computing platform 810) executing one or more instructions from storage or memory.

In the example configuration shown in FIG. 8, hardware on the computer platforms 810 and/or 815 can include one or more of a network interface 852, a processor 854, an output device 856, an input device 858, a storage 860 and other devices 862. One or more system buses can interconnect these components. The number, identity and arrangement of these elements are not limited to what is shown, and additional and/or different elements can be contained in or coupled with the elements shown. Further, the platforms 810 and 815 can include fewer components than what is shown. Although depicted with similar components, the platforms 810 and 815 can be configured differently, each platform having additional, fewer or different elements than what is shown as an example in the figure. For example, the client platform 815 can be a mobile device with fewer or different components from what is included in the server 810.

The network interface 852 facilitates connectivity with a network, such as the network 875. Network interface 852 can be any appropriate wireline (e.g., IEEE (Institute of Electrical and Electronics Engineers, Inc.) 1394, Universal Serial Bus (USB), etc.) or wireless (e.g., IEEE 802.11™, BLUETOOTH®, IrDA®, etc.) mechanism for facilitating unidirectional or bidirectional transmission of data between the computer platform and the network 875. The network interface 852 can include one or more network cards and/or data and communication ports.

The processor 854 can execute instructions from storage or memory, route information among components of the computer platform, and/or perform various operations on data. Each of the platforms 810 and 815 can include any number of general- and/or special-purpose processors, which can operate collaboratively or independently. In some examples, the processor 854 can include one or more application specific integrated circuits (ASICs) and/or various other circuitry. The processor 854 can include various logical elements and architectures (e.g., the von Neumann architecture, parallel architectures, etc.) and can perform various types of computational operations, such as sequential computation and parallel computation.

The output device(s) 856 can present text, images, video, audio, or any other type of information. Examples of the output device 856 include, video display devices, audio display devices, printers, and the like. The output device 856 can display user interface information for various software applications and tools running on the computer platform, as well as the operating system programs necessary to operate the system. The output device 856 can present information by way of a cathode ray tube, liquid crystal, liquid crystal on silicon, light-emitting diode, gas plasma, laser, or other type of display mechanism. The output device 856 can also be configured to receive, generate and/or present holographic or other visual representations. The output device 856 can be configured to audibly present information, and it can include suitable components for receiving and presenting audio signals. Each of the platforms 810 and 815 can include any number of similar or different output devices.

The input device(s) 858 can include components such as a keyboard, a mouse, a stylus, a pointing device, a joystick, and/or a touch screen. The input device 858 can also include audio- or video-capture devices (e.g., video cameras, microphones, etc.) and/or various sensors for capturing and processing emissions (e.g., thermal, motion, sound, etc.). It can also include one or more information reading devices (e.g., scanners, disk drives, etc.) and/or input ports. Each of the platforms 810 and 815 can include any number of similar or different input devices. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The storage 860 can provide mass storage, working (e.g., cache) memory, and/or buffer space for the system. The storage 860 can be implemented using a variety of suitable memory elements. The memory elements can include, for example, solid state elements, optical elements, polymer elements, magnetic elements, and/or organic elements (e.g., crystals). The memory elements can be volatile or non-volatile and can be randomly or sequentially accessed. The storage 860 can include random access memory (RAM), flash RAM, read-only memory (ROM), erasable programmable read-only memory (EPROM), and electrically erasable programmable read-only memory (EEPROM). The storage 860 can include one or more fixed disk drives (e.g., a hard drive, RAID storage, etc.) and one or more removable disk drives (e.g., a CD-ROM drive, DVD drive, etc.). The storage 860 can also include one or more data repositories (e.g., relational, distributed and/or object-oriented databases), which can be local and/or remote to the platform. In some examples, the storage 860 can include one or more local and/or remote network-based storage architectures, such as a storage area network (SAN). Each of the platforms 810 and 815 can include or interact with any number of individually configured storage elements 860.

The storage 860 can store program code for various applications, an operating system 820, an application-programming interface, application routines, middleware components, and/or other executable instructions. The storage 860 can include program code and information for communications (e.g., TCP/IP communications), middleware components, kernel and device drivers, invariant low-level systems code, data for basic input and output, and various configuration information.

In some implementations, the storage 860 includes at least one computer readable medium, which tangibly embodies one or more computer programs. The computer programs can contain instructions that, when executed by a processor, implement various methods (such as those described below) and/or systems. Computer readable medium refers generally to any type of computer program, apparatus and/or device (e.g., magnetic discs, optical disks, memory, Programmable Logic Devices (PLDs)) used to provide machine instructions and/or data to a processor. Computer readable media suitable for storing computer programs and data can include forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

The other devices 862 can include, for example, various devices used for video and film editing. Examples include video controllers, video recorders, audio recording systems, backup power supplies, etc. Moreover, the other devices 862 can include any digital print engine or marking engine, display monitor, or other raster output device capable of producing color or gray scale pixels on paper, film, display screen, or other output medium.

As shown in FIG. 8, the server platform 810 includes an operating system 820 and a streaming module 830 and a caching module 835. The operating system 820 can include any suitable operating system (OS) for managing computing resources and hosting applications (e.g., WINDOWS® OS, MAC® OS, UNIX® OS, LINUX® OS, and the like).

The streaming module 830 can include any suitable component for streaming content over the network 875. In some examples, the streaming module 830 can be configured to implement functionality associated with the server 140 of the environment 100. The streaming module 830 can be implemented in or part of a server module or application 840, which can be configured to interact with and service components of the client platform 815 (e.g., the player 870). The streaming module 830 can be configured to receive digital media and stream the received media to the client platform 815 over the network 875 according to various protocols. The streaming module 830 can be configured to store and/or access one or more DVR streams (e.g., the stream 205).

In some examples, the streaming module 830 can receive streams that have already been formatted using one or more codecs. In some examples, the streaming module 830 can receive unformatted (e.g., uncompressed) media (e.g., a live video feed from a user's webcam) and can be configured to format the received media into content streams using one or more codecs. Thus, in some implementations, the streaming module 830 can include and/or leverage one or more codes (such as the H.264 codec, the On2 VP6 codec, the Sorenson Spark codec, etc.) to compress received streams for streaming to the client platform 815. In some implementations, the streaming module 830 can receive a live video feed that is already encoded in a specific codec and the streaming module 830 can change that codec type when streaming the feed to a client.

The streaming module 830 can receive media through one or more interfaces and transmit content streams via one or more other interfaces. The streaming module 830 can be configured to transmit content streams (e.g., live video or other live streams) at various transmission rates, resolutions, formats, etc. The particular manner in which the content streams are streamed can depend on the alteration module 835.

The caching module 835 can include any suitable component for caching DVR streams received from the network 875. In some examples, the caching module 835 can be configured to implement functionality associated with the caching application 130 of the environment 100. The caching module 835 can include one or more suitable storage or memory elements for storing or caching DVR streams.

The streaming module 830 and the caching module 835 can include and/or use one more data structures as well as one or more computational algorithms that can operate on various data. The modules can include sets of instructions for performing various tasks, and the modules can output information for use by users or other systems. In some implementations, the modules can include one or more engines, which can output code that serves as input to other systems, engines or processes. The modules can include and/or use various hardware and firmware elements.

The client platform 815 can include a suitable operating system 820, a player 870, one or more applications 880 and a duration module 885. The player 870 can be configured to implement functionality consistent with the player 170 of the environment 100, and the duration module 885 can be configured to implement functionality consistent with the duration logic 180 of the environment 100.

The duration module 885 can include and/or use one more data structures as well as one or more computational algorithms that can operate on various data. The module can include sets of instructions for performing various tasks, and the module can output information for use by users or other systems. The module can include one or more engines, which can output code that serves as input to other systems, engines or processes. The module can include and/or use various hardware and firmware elements. Although shown as a discrete module within the client platform 815, the functionality of the duration module 885 can be distributed among various elements.

The applications 880 can include various computer programs, which contain instructions executable by one or more processors (e.g., the processors 854). Computer programs consistent with this disclosure can be implemented in various programming languages, such as high- or mid-level procedural and object-oriented programming languages (e.g., C, C++, JAVA®, JAVASCRIPT®, PHP, VISUAL BASIC®, etc.), low-level assembly languages (INTEL® 80×86, ARM, etc.) and/or various other languages. In some examples, the applications 880 can include the application 160 of the environment 100.

In some implementations, the client platform can include a runtime environment that provides various utility services for use by the applications 880. These utility services can include file system access, window and menuing, integration with the OS shell (e.g., WINDOWS® OS Explorer or MAC® OS Finder), file extension registration, document processing support (e.g., Hypertext Markup Language (HTML) and Portable Document Format (PDF) engines), string manipulation, graphics, networking, notification facilities, addressing peripherals, or other types of functionality that can be provide using a runtime library. Moreover, the runtime environment can include an API that provides services to applications and abstracts details of various hardware and OS platforms on which the runtime environment has been configured to operate.

The discrete modules shown in FIG. 8 are used herein for purposes of explanation only, and various other arrangements are within the scope of this disclosure. For example, the various functionality of these modules can be distributed or exist in more or less modules than what is shown in the figure. The particular configuration, arrangement and feature set of the individual modules will typically depend on the particular operating environment.

Although the following description refers to streaming, aspects of this disclosure can apply to other media delivery techniques. For example, aspects of this disclosure can be leveraged in distributed network topologies (e.g., object replication in RTMFP groups) by using a central arbiter acting as the server portion within a group in which to distribute duration metadata. The central arbiter can include, for example, any network node in the group designated as a metadata origin point.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them.

A computer program (also known as a program, software, software application, script, or code) can be written in any form of programming language, including compiled or interpreted languages, declarative or procedural, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the disclosure have been described. Other implementations are within the scope of the following claims. For example, the actions recited in the claims can be performed in a different order and still achieve desirable results.

What is claimed is:

1. A computer-implemented method, comprising:
receiving streaming content from a server;
storing and queuing a portion of the content stream for playback at a client-side display device;
receiving, from the server and in response to a request, and in a communication that is separate from the content stream, intermediate duration information corresponding to a duration of the content stream available to be streamed from the server at a time of the request;
calculating, at a client-side application, an estimated current duration of the content stream based on the intermediate duration information, wherein the estimated current duration is calculated without obtaining additional duration information from the server beyond the intermediate duration information, and wherein the estimated current duration is greater than the duration of the content stream available to be streamed from the server at the time of the request;
wherein calculating the estimated current duration at the client-side application comprises:
(a) setting a timestamp associated with the content stream, the timestamp representing a time that the intermediate duration information is received from the server;
(b) identifying a current client-side system time associated with a system timer;
(c) determining a difference between the current client-side system time and the time represented by the timestamp;
(d) adding to the determined difference the intermediate duration information; and
(e) storing a result of performing (a), (b), (c) and (d) as the estimated current duration;
generating a timeline control based on the estimated current duration, the timeline control presenting a representation of the estimated current duration and allowing navigation forward and backward in the content stream; and
displaying the timeline control at the client-side display device.

2. The method of claim 1, further comprising actively calculating the estimated current duration until a threshold duration is reached, and upon reaching the threshold duration:
sending to the server a subsequent request for subsequent intermediate duration information corresponding to a subsequent duration of the content stream, wherein the subsequent request is sent to the server without user intervention; and
receiving, from the server, the subsequent intermediate duration information in response to the subsequent request.

3. The method of claim 1, further comprising:
receiving a command that manipulates the timeline control;

navigating in the content stream based on the command; and displaying the content stream based on the navigating.

4. The method of claim 1, the method further comprising:

receiving a command to seek to a live time in the content stream corresponding to a currently-streaming portion of the content stream;

determining, in response to the received command, a difference between the estimated current duration and a playback buffer capacity;

determining a particular time in the content stream based on the determined difference; and displaying the content stream at the determined particular time.

5. A machine-readable storage device storing a computer program product, the computer program product having instructions operable to cause one or more data processing apparatus to perform operations comprising:

receiving a content stream from a server;

storing and queuing a portion of the content stream for playback at a client-side display device;

receiving, from the server and in response to a request, and in a communication that is separate from the content stream, intermediate duration information corresponding to a duration of the content stream available to be streamed from the server at a time of the request;

calculating, at a client-side application, an estimated current duration of the content stream based on the intermediate duration information, wherein the estimated current duration is calculated without obtaining additional duration information from the server beyond the intermediate duration information, and wherein the estimated current duration is greater than the duration of the content stream available to be streamed from the server at the time of the request;

wherein calculating the estimated current duration at the client-side application comprises:
  (a) setting a timestamp associated with the content stream, the timestamp representing a time that the intermediate duration information is received from the server;
  (b) identifying a current client-side system time associated with a system timer;
  (c) determining a difference between the current client-side system time and the time represented by the timestamp;
  (d) adding to the determined difference the intermediate duration information; and
  (e) storing a result of performing (a), (b), (c) and (d) as the estimated current duration;

generating a timeline control based on the estimated current duration, the timeline control presenting a representation of the estimated current duration and allowing navigation forward and backward in the content stream; and displaying the timeline control at the client-side display device.

6. The storage device of claim 5, further comprising actively calculating the estimated current duration until a threshold duration is reached, and upon reaching the threshold duration:

sending to the server a subsequent request for subsequent intermediate duration information corresponding to a subsequent duration of the content stream, wherein the subsequent request is sent to the server without user intervention; and receiving, from the server, the subsequent intermediate duration information in response to the subsequent request.

7. The storage device of claim 5, wherein the operations further comprise:

receiving a command that manipulates the timeline control;

navigating in the content stream based on the command; and displaying the content stream based on the navigating.

8. The storage device of claim 5, wherein the operations further comprise:

receiving a command to seek to a live time in the content stream corresponding to a currently-streaming portion of the content stream;

determining, in response to the received command, a difference between the estimated current duration and a playback buffer capacity;

determining a particular time in the content stream based on the determined difference; and displaying the content stream at the determined particular time.

9. A system, comprising:

at least one processing device; and a storage device storing instructions operable to cause the at least one processing device to perform operations comprising:

receiving a content stream from a server;

storing and queuing a portion of the content stream for playback at a client-side display device;

receiving, from the server and in response to a request, and in a communication that is separate from the content stream, intermediate duration information corresponding to a duration of the content stream available to be streamed from the server at a time of the request;

calculating, at a client-side application, an estimated current duration of the content stream based on the intermediate duration information, wherein the estimated current duration is calculated without obtaining additional duration information from the server beyond the intermediate duration information, and wherein the estimated current duration is greater than the duration of the content stream available to be streamed from the server at the time of the request;

wherein calculating the estimated current duration at the client-side application comprises:
  (a) setting a timestamp associated with the content stream, the timestamp representing a time that the intermediate duration information is received from the server;
  (b) identifying a current client-side system time associated with a system timer;
  (c) determining a difference between the current client-side system time and the time represented by the timestamp;
  (d) adding to the determined difference the intermediate duration information; and
  (e) storing a result of performing (a), (b), (c) and (d) as the estimated current duration;

generating a timeline control based on the estimated current duration, the timeline control presenting a representation of the estimated current duration and allowing navigation forward and backward in the content stream; and displaying the timeline control at the client-side display device.

10. The system of claim 9, further comprising actively calculating the estimated current duration until a threshold duration is reached, and upon reaching the threshold duration:
    sending to the server a subsequent request for subsequent intermediate duration information corresponding to a subsequent duration of the content stream, wherein the subsequent request is sent to the server without user intervention; and
    receiving, from the server, the subsequent intermediate duration information in response to the subsequent request.

11. The system of claim 9, wherein the operations further comprise:
    receiving a command that manipulates the timeline control;
    navigating in the content stream based on the command; and
    displaying the content stream based on the navigating.

12. The system of claim 9, wherein the operations further comprise:
    receiving a command to seek to a live time in the content stream corresponding to a currently-streaming portion of the content stream;
    determining, in response to the received command, a difference between the estimated current duration and a playback buffer capacity;
    determining a particular time in the content stream based on the determined difference; and
    displaying the content stream at the determined particular time.

\* \* \* \* \*